US011751155B2

(12) United States Patent
Sakhnini et al.

(10) Patent No.: US 11,751,155 B2
(45) Date of Patent: Sep. 5, 2023

(54) TECHNIQUES FOR INDICATING TIME OFFSETS IN WIRELESS COMMUNICATIONS

(71) Applicant: QUALCOMM Incorporated, San Diego, CA (US)

(72) Inventors: Iyab Issam Sakhnini, San Diego, CA (US); Tao Luo, San Diego, CA (US); Qiang Wu, San Diego, CA (US); Xiaoxia Zhang, San Diego, CA (US); Jun Ma, San Diego, CA (US); Wooseok Nam, San Diego, CA (US); Juan Montojo, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/222,162

(22) Filed: Apr. 5, 2021

(65) Prior Publication Data

US 2021/0360561 A1 Nov. 18, 2021

Related U.S. Application Data

(60) Provisional application No. 63/023,619, filed on May 12, 2020.

(51) Int. Cl.
*H04W 56/00* (2009.01)
*H04W 72/04* (2023.01)
(Continued)

(52) U.S. Cl.
CPC ....... *H04W 56/0035* (2013.01); *H04L 5/0048* (2013.01); *H04W 56/004* (2013.01); *H04W 72/23* (2023.01)

(58) Field of Classification Search
CPC .......... H04W 56/0035; H04W 56/004; H04W 72/042; H04L 5/0048
See application file for complete search history.

(56) References Cited

U.S. PATENT DOCUMENTS 7,634,227 B2 * 12/2009 de Jong ........... H04N 21/23406
2013/0188577 A1 * 7/2013 Papasakellario ...... H04L 5/0053
(Continued)

FOREIGN PATENT DOCUMENTS

WO  2018082500 A1  5/2018
WO  2020085880 A1  4/2020
WO  2020235884 A1  11/2020

OTHER PUBLICATIONS

International Search Report and Written Opinion—PCT/US2021/026026—ISA/EPO—dated Jun. 23, 2021.

*Primary Examiner* — Ronald B Abelson
(74) *Attorney, Agent, or Firm* — DALEI DONG; ArentFox Schiff LLP

(57) ABSTRACT

Aspects described herein relate to communicating a demodulation reference signal (DMRS) corresponding to a downlink control channel, buffering, based on receiving the DMRS, samples of a downlink data channel associated with the downlink control channel, and processing, during on a time period indicated based at least in part on a sequence of the DMRS, at least a portion of the samples of the downlink data channel. Another aspect relates to determining, based at least in part on a sequence of the DMRS, a time offset from the downlink control channel to a downlink data channel, and determining, based at least in part on the time offset, a time period based on which to transmit or start processing samples of the downlink data channel.

26 Claims, 8 Drawing Sheets

(51) Int. Cl.
  *H04L 5/00*   (2006.01)
  *H04W 72/23*  (2023.01)

(56) References Cited

U.S. PATENT DOCUMENTS

2020/0128542 A1* 4/2020 Tang ................. H04W 72/0453
2021/0051683 A1* 2/2021 Li ....................... H04L 41/0806
2021/0152306 A1* 5/2021 Liu ....................... H04L 5/0035
2021/0321349 A1* 10/2021 Tang ................. H04W 56/0015
2022/0217756 A1* 7/2022 Wu .................... H04L 27/2602

* cited by examiner

TECHNIQUES FOR INDICATING TIME OFFSETS IN WIRELESS COMMUNICATIONS

The present Application for Patent claims priority to Provisional Patent Application No. 63/023,619, entitled "TECHNIQUES FOR INDICATING TIME OFFSETS IN WIRELESS COMMUNICATIONS" filed May 12, 2020, which is assigned to the assignee hereof and hereby expressly incorporated by reference herein for all purposes.

BACKGROUND

Aspects of the present disclosure relate generally to wireless communication systems, and more particularly, to timing between communicating control information and corresponding data.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In some wireless communication technologies, such as fifth generation (5G) new radio (NR), downlink control information (DCI) can be used to indicate a downlink physical downlink shared channel (PDSCH) grant. The DCI can also include time domain resource assignment (TDRA) information indicating, based on a lookup table, a slot offset between the physical downlink control channel (PDCCH) carrying the DCI to the slot having the PDSCH, a starting symbol, and a length (in number of symbols) of the PDSCH allocation within the PDSCH slot. Thus, the UE receiving the communication can decode the DCI, determine the TDRA information, and determine a time at which the corresponding PDSCH allocation begins (and the time length) based on TDRA information.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, an apparatus for wireless communication is provided. The apparatus includes a transceiver, a memory configured to store instructions, and one or more processors coupled with the memory and the transceiver. The one or more processors are configured to receive a demodulation reference signal (DMRS) corresponding to a downlink control channel, buffer, based on receiving the DMRS, samples of a downlink data channel associated with the downlink control channel, and process, during on a time period indicated based at least in part on a sequence of the DMRS, at least a portion of the samples of the downlink data channel.

In another aspect, an apparatus for wireless communication is provided that includes a transceiver, a memory configured to store instructions, and one or more processors coupled with the memory and the transceiver. The one or more processors are configured to generate a DMRS corresponding to a downlink control channel to have a DMRS sequence indicating a time offset from the downlink control channel to a downlink data channel, transmit the downlink control channel and the DMRS, and transmit, based on the time offset, the downlink data channel after the downlink control channel.

In another aspect, a method of wireless communication is provided. The method includes receiving a DMRS corresponding to a downlink control channel, buffering, based on receiving the DMRS, samples of a downlink data channel associated with the downlink control channel, and processing, during on a time period indicated based at least in part on a sequence of the DMRS, at least a portion of the samples of the downlink data channel.

In another aspect, a method for wireless communication includes generating a DMRS corresponding to a downlink control channel to have a DMRS sequence indicating a time offset from the downlink control channel to a downlink data channel, transmitting the downlink control channel and the DMRS, and transmitting, based on the time offset, the downlink data channel after the downlink control channel.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
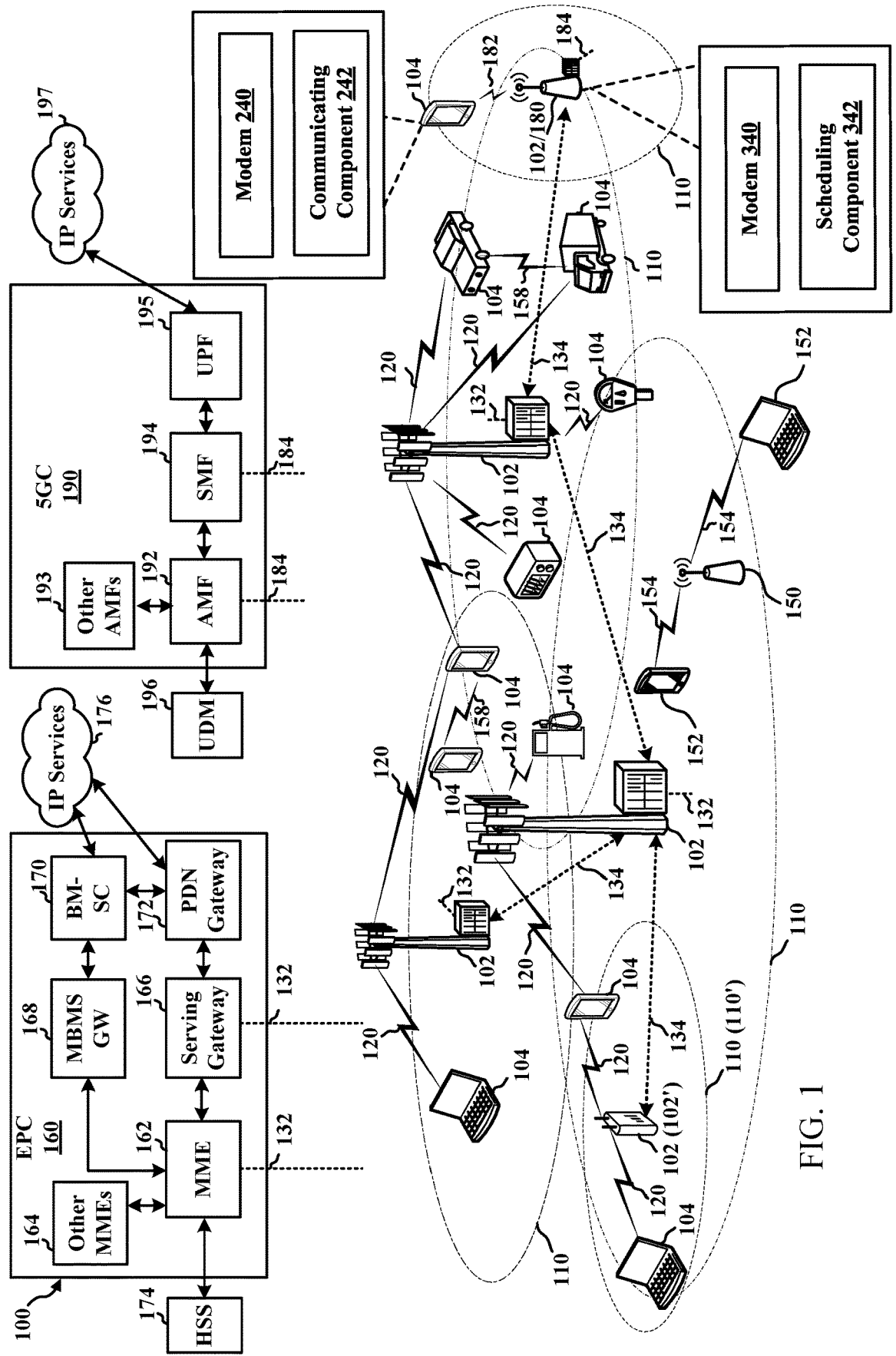
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to indicating a time offset between control information and corresponding data communications. In some wireless communication technologies, such as fifth generation (5G) new radio (NR), downlink control information (DCI) can be used to indicate physical downlink shared channel (PDSCH) grants, and the DCI can include time domain resource assignment (TDRA) information. A lookup table can be used to map TDRA values into values of k0, S, and L, where k0 is a slot offset from the slot having the physical downlink control channel (PDCCH) that carries the DCI to the slot having the PDSCH, S is the starting time period indicated as an index of a symbol (e.g., orthogonal frequency division multiplexing (OFDM) symbol) within the slot of the PDSCH allocation, and L is the length of PDSCH allocation within the slot indicated as a number of symbols.

For example, a user equipment (UE) or other device can receive the downlink communications from a base station or other node via the downlink control channel (e.g., PDCCH) and corresponding downlink data channel (e.g., PDSCH). In an example, the base station can configure the lookup table for the UE, or the lookup table can be otherwise specified and/or hardcoded in the UE. In either case, the UE can receive DCI from the base station over the downlink control channel, determine the TDRA value based on decoding the DCI, determine k0, S, and L based on determining the values to which the TDRA value maps in the lookup table, and accordingly determine a time offset at which the data channel is transmitted and/or should be received from the base station. Because the UE does not know the TDRA value until it decodes DCI, and as the value can be changing based on network scheduling needs, the UE can buffer samples starting from the DCI reception until DCI is decoded just in case PDSCH is present before the UE decodes DCI (e.g., where TDRA value indicates a slot and symbol offset that is less than UE DCI decode time).

In higher operating NR bands (e.g., greater than 52.6 gigahertz (GHz)), larger subcarrier spacings (SCSs) are possible to support larger bandwidth with manageable fast Fourier transform (FFT) sizes, such as 960 kilohertz (kHz), 1920 kHz, 3840 kHz, etc. Higher SCS can correspond to a smaller OFDM symbol length. In case of the higher SCS (smaller OFDM symbols), the PDSCH sample buffering may increase, which may also impact UE memory, power, and processing timeline. Therefore, it may be beneficial for the UE to know the TDRA information (or at least k0) earlier than after DCI decoding to reduce the amount of buffering. Typically, demodulation reference signal (DMRS) sequence detection can occur earlier than DCI decoding. Thus, in examples described herein, PDCCH DMRS sequence can carry information about the TDRA so that the UE can determine when to start buffering before DCI decoding is completed. In 5G NR, PDCCH DMRS sequence can be defined per control resource set (CORESET) and can be confined to PDCCH candidates and wideband across all PDCCH candidates in the CORESET. PDCCH DMRS sequence can be a pseudo-random sequence with initialization that depends at least on OFDM symbol number within the slot, slot number within a frame, and/or $N_{ID}$, which can be signaled to the UE (or $N_{ID}^{cell}$ if not signaled).

In aspects described herein, a DMRS for a control channel can be used to signal a time offset between the control channel and the corresponding data channel. For example, the DMRS sequence can map to or otherwise indicate a k0 value or subset or range of k0 values, TDRA information or subset or range of TDRA information from which k0, S, and L can be determined, etc. In this example, the UE can determine when to start buffering samples for the data channel based on the DMRS sequence without waiting for DCI decoding to determine that start of the data channel. This can reduce the buffering time for a device, which would otherwise start buffering received communications from the time between receiving the control channel and decoding DCI, to the time between receiving the control channel and determining the DMRS sequence. Once the DMRS sequence is determined, buffering can occur (e.g., continue) starting at a corresponding k0, and/or any previously buffered samples can be flushed.

Using the DMRS sequence to determine a starting time for buffering can, in turn, improve UE memory usage, power consumption, processing timeline, etc. For example, once the device determines the DMRS sequence, it can determine whether to retain buffered data samples for processing (e.g., where k0 identified from the DMRS sequence is less than or equal to the current time offset from the control channel) or whether the buffer can be flushed (e.g., where k0 identified from the DMRS sequence is greater than the current time offset from the control channel).

The described features will be presented in more detail below with reference to FIGS. 1-8.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDMTM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and communicating component 242 for determining a time offset from a control channel to a corresponding data channel, in accordance with aspects described herein. In addition, some nodes may have a modem 340 and scheduling component 342 for configuring a device for determining a time offset from a control channel to a corresponding data channel, in accordance with aspects described herein. Though a UE 104 is shown as having the modem 240 and communicating component 242 and a base station 102/gNB 180 is shown as having the modem 340 and scheduling component 342, this is one illustrative example, and substantially any node or type of node may include a modem 240 and communicating component 242 and/or a modem 340 and scheduling component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (B S S), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, scheduling component 342 can transmit a downlink control channel and corresponding reference signal (e.g., DMRS) to a UE for scheduling resources for a corresponding downlink data channel. Scheduling component 342 can generate a sequence for the DMRS to signal a time offset between the downlink control channel and the corresponding downlink data channel. In an example, communicating component 242 can accordingly receive the DMRS and determine the time offset based on the sequence used for the DMRS. Communicating component 242 can, based on the time offset, decode the downlink data channel, determine a time for receiving and/or decoding the downlink data channel, and/or determine whether to buffer samples for the downlink data channel.

Figure 2:
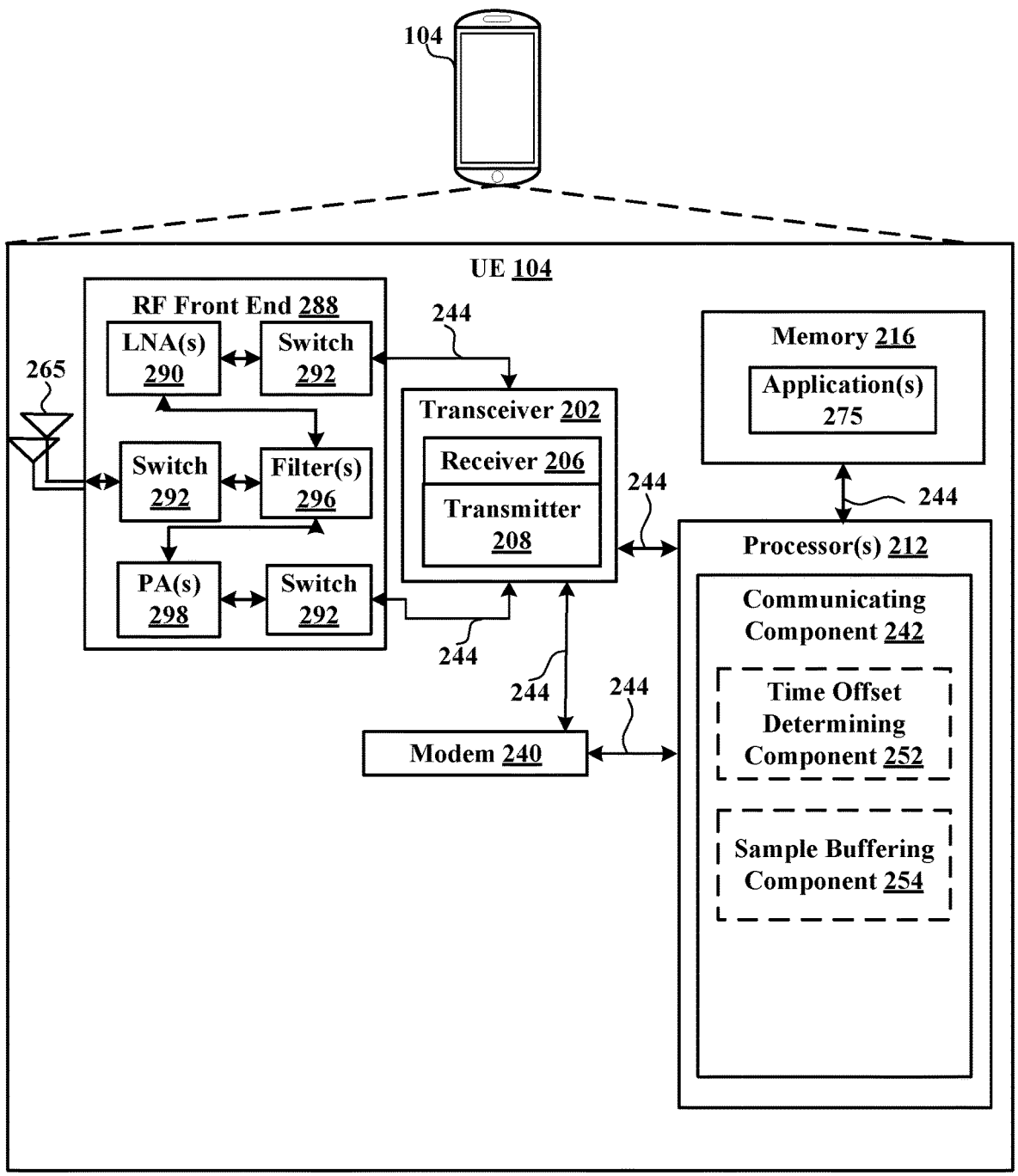
FIG. 2 is a block diagram illustrating an example of a UE, in accordance with various aspects of the present disclosure.
Figure 3:
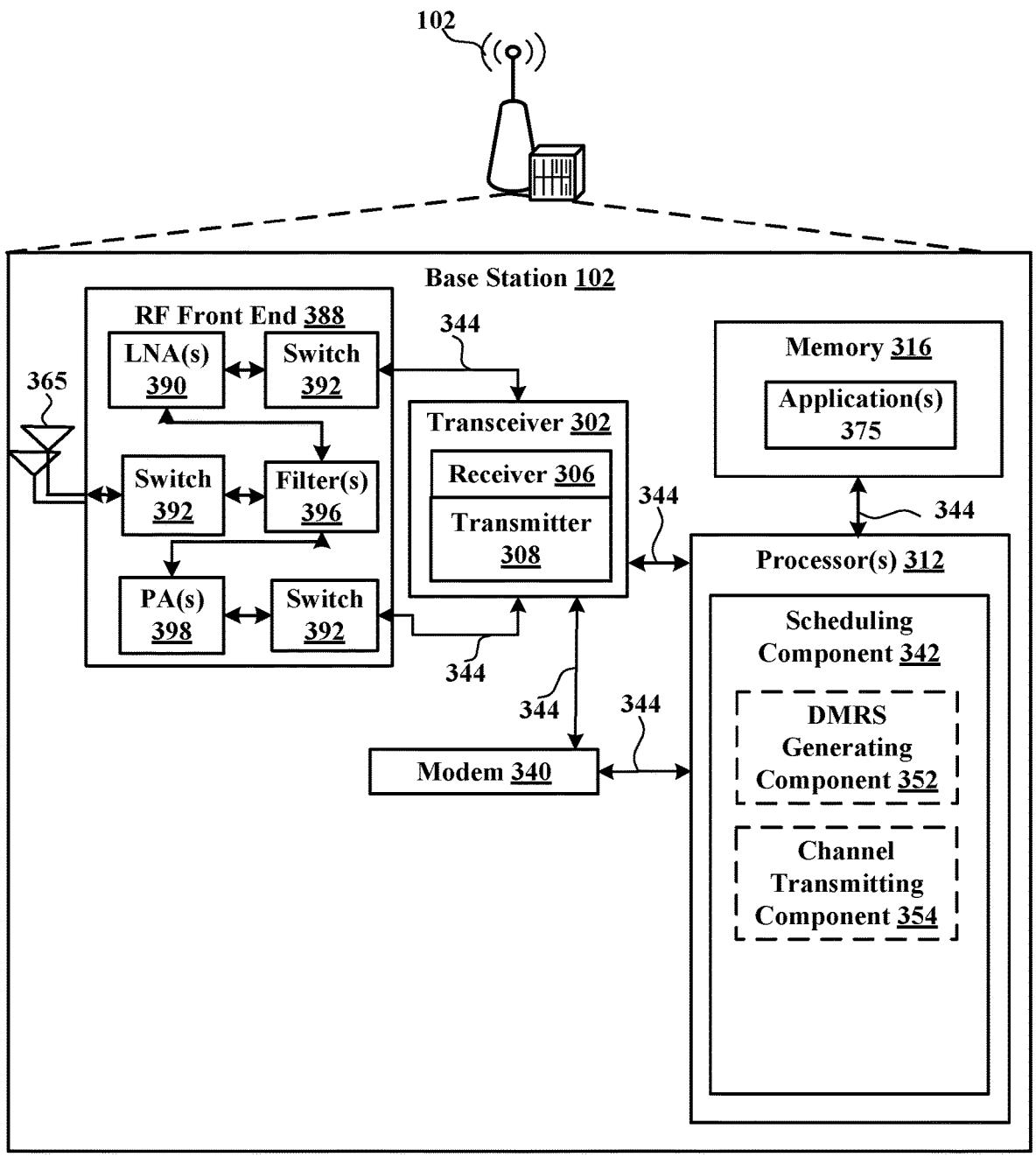
FIG. 3 is a block diagram illustrating an example of a base station, in accordance with various aspects of the present disclosure.
Figure 4:
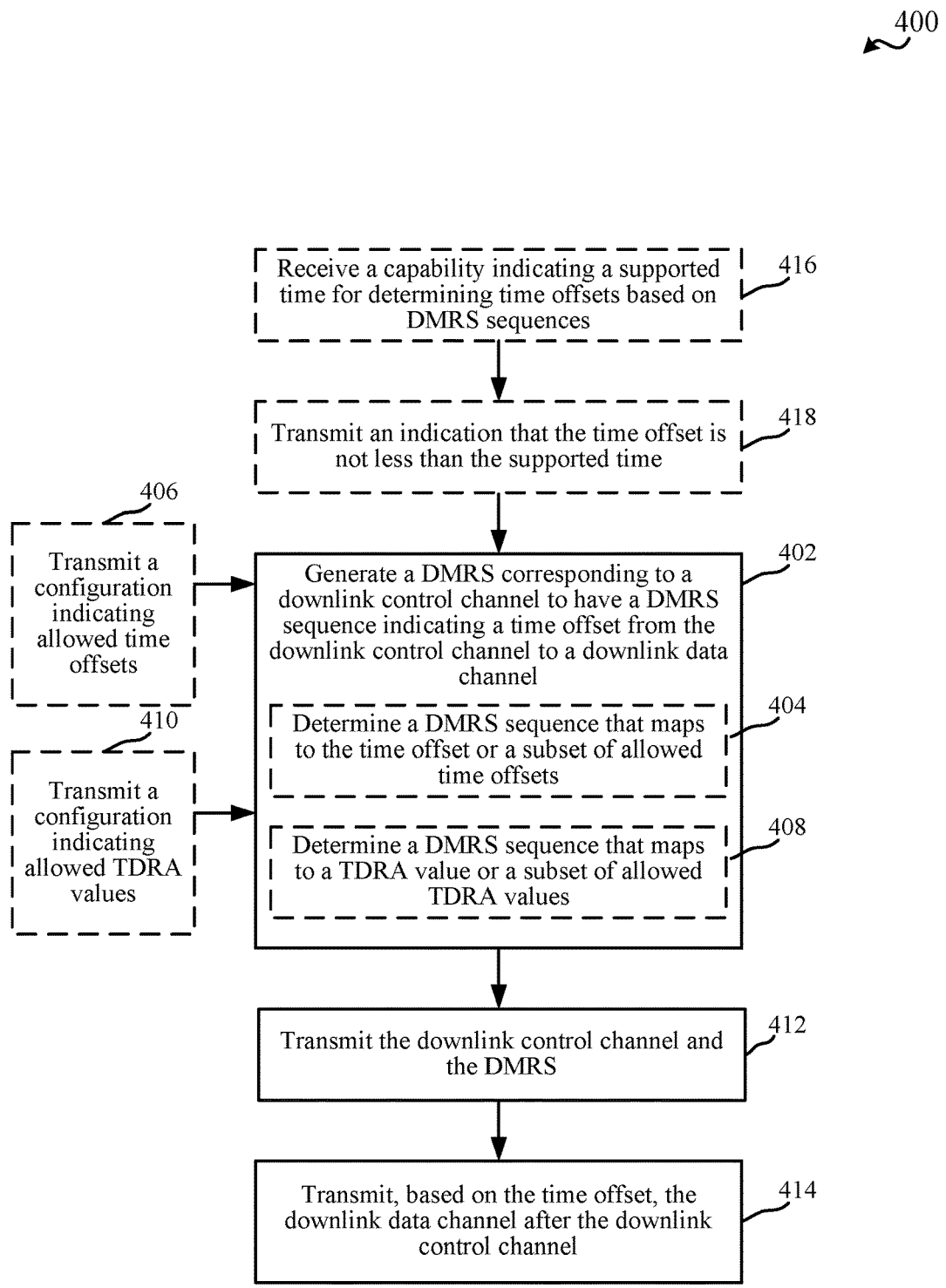
FIG. 4 is a flow chart illustrating an example of a method for generating a demodulation reference signal (DMRS) to indicate a time offset between a downlink control channel and a downlink data channel, in accordance with various aspects of the present disclosure.
Figure 5:
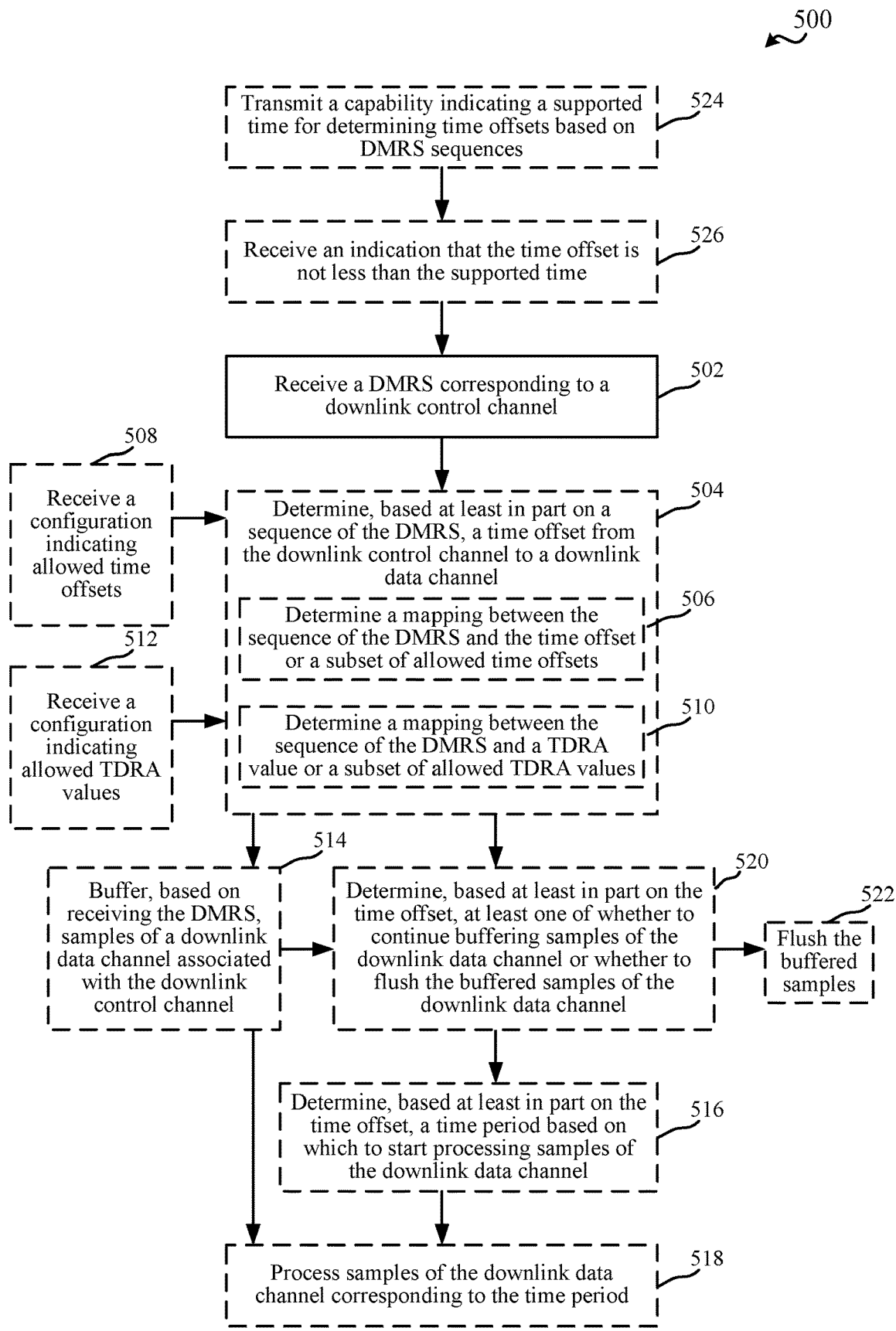
FIG. 5 is a flow chart illustrating an example of a method for determining, based on a DMRS, a time offset between a downlink control channel and a downlink data channel, in accordance with various aspects of the present disclosure.

Turning now to FIGS. 2-8, aspects are depicted with reference to one or more components and one or more methods that may perform the actions or operations described herein, where aspects in dashed line may be optional. Although the operations described below in FIGS. 4-5 are presented in a particular order and/or as being performed by an example component, it should be understood that the ordering of the actions and the components performing the actions may be varied, depending on the implementation.

Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication (e.g., coupled, such as communicatively, operationally, electrically, electronically, or otherwise) via one or more buses 244, which may operate in conjunction with modem 240 and/or communicating component 242 for determining a time offset from a control channel to a corresponding data channel, in accordance with aspects described herein.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 242 can optionally include a time offset determining component 252 for determining a time offset between the downlink control channel and a corresponding downlink data channel based on the DMRS, and/or a sample buffering component 254 for buffering samples of the downlink data channel until the time offset can be determined, in accordance with aspects described herein.

In an aspect, the processor(s) 212 may correspond to one or more of the processors described in connection with the UE in FIG. 8. Similarly, the memory 216 may correspond to the memory described in connection with the UE in FIG. 8.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication (e.g., coupled, such as communicatively, operationally, electrically, electronically, or otherwise) via one or more buses 344, which may operate in conjunction with modem 340 and scheduling component 342 for configuring a device for determining a time offset from a control channel to a corresponding data channel, in accordance with aspects described herein.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, scheduling component 342 can optionally include a DMRS generating component 352 for generating a DMRS using a sequence selected to indicate a time offset between a downlink control channel and a corresponding downlink data channel, and a channel transmitting component 354 for transmitting the downlink control channel, downlink data channel, DMRSs or other reference signals, etc., in accordance with aspects described herein.

In an aspect, the processor(s) 312 may correspond to one or more of the processors described in connection with the base station in FIG. 8. Similarly, the memory 316 may correspond to the memory described in connection with the base station in FIG. 8.

FIG. 4 illustrates a flow chart of an example of a method 400 for using a DMRS sequence to indicate a time offset between a downlink control channel and a downlink data channel, in accordance with aspects described herein. FIG. 5 illustrates a flow chart of an example of a method 500 for determining, based on a DMRS sequence, a time offset between a downlink control channel and a downlink data channel, in accordance with aspects described herein. In an example, a base station 102 can perform the functions described in method 400 using one or more of the components described in FIGS. 1 and 3. In an example, a UE 104 can perform the functions described in method 500 using one or more of the components described in FIGS. 1 and 2. Methods 400 and 500 are described below in conjunction with one another to ease explanation of the associated functions and concepts. Methods 400 and 500 are not required to be performed in conjunction with one another, and indeed one device can be configured to perform method 400 without having a corresponding device that performs method 500 and vice versa, in at least one example.

In method 400, at Block 402, the base station can generate a DMRS corresponding to a downlink control channel to have a DMRS sequence indicating a time offset from the downlink control channel to a downlink data channel. In an aspect, DMRS generating component 352, e.g., in conjunction with processor(s) 312, memory 316, transceiver 302, scheduling component 342, etc., can generate the DMRS corresponding to the downlink control channel to have the DMRS sequence indicating the time offset from the downlink control channel to the downlink data channel. In one example, the time offset can include a slot offset (e.g., a number of slots) from a slot of the downlink control channel to the downlink data channel, a symbol offset of a starting symbol within the downlink data channel slot at which the downlink data channel begins, etc. For example, DMRS generating component 352 can generate the DMRS to indicate the time offset, one of a subset of time offset values, a TDRA value, one of a subset of TDRA values, and/or the like. In a specific example, DMRS generating component 352 can include a value to indicate the time offset as a parameter in an initialization equation used by a sequence generator for generating the DMRS sequence for the downlink control channel. In this example, DMRS generating component 352 can set the value used to indicate the time offset (e.g., whether a slot offset and/or symbol offset value, indication of one of a subset of slot offset and/or symbol offset values, TDRA value, indication of one of a subset of TDRA values, etc.), as a parameter in the initialization equation, and can accordingly generate the DMRS sequence using the time offset value as a parameter. This can allow a UE or other device receiving the DMRS to determine the time offset based on the DMRS sequence, as described.

In one example, in generating the DMRS at Block 402, optionally at Block 404, the base station can determine a DMRS sequence that maps to the time offset or a subset of allowed time offsets. In an aspect, DMRS generating component 352, e.g., in conjunction with processor(s) 312, memory 316, transceiver 302, scheduling component 342, etc., can determine the DMRS sequence that maps to the time offset or a subset of allowed time offsets. For example, DMRS generating component 352 can select a DMRS sequence that can be used to indicate the time offset (e.g., where the base station 102 and receiving device can know, store, or otherwise be configured with, the mapping of DMRS sequence, or associated parameter used to generate the sequence, to time offset value). In another example, DMRS generating component 352 can generate the DMRS sequence using the time offset value as a parameter, as described. At least where the time offset value is indicated, scheduling component 342 can still indicate the TDRA value in DCI (or otherwise indicate the starting symbol offset, S, and/or length, L) so the receiving device can determine the slot offset (e.g., k0) from the DMRS and then determine, based on the DCI, where within the slot the downlink data channel begins and/or a length (in symbols) of the downlink data channel.

In an example, where DMRS generating component 352 selects a time offset value to indicate one of a subset of allowed time offsets, optionally at Block 406, the base station can transmit a configuration indicating the allowed time offsets. In an aspect, scheduling component 342, e.g., in conjunction with processor(s) 312, memory 316, transceiver 302, etc., can transmit the configuration indicating the allowed time offsets. For example, the configuration may indicate an enumeration of time offset values, and the DMRS can indicate an index into the enumeration. For example, the allowed time offsets may include the set of {0,5,10,15} slots. In this example, the time offset value indicated by the DMRS may include {0,1,2,3}, which can respectively refer to a time offset in the set. Moreover, in an example, where the actual time offset is not included in the set, DMRS generating component 352 can select one of the values in the set that is near the actual time offset (e.g., the smallest value greater than the actual time offset, the largest value less than the actual time offset, etc.). Moreover, in an example, the time offset or subset of allowed time offsets can correspond to a slot offset value (e.g., k0) and/or a corresponding symbol offset value within the slot.

In one example, in generating the DMRS at Block 402, optionally at Block 408, the base station can determine a DMRS sequence that maps to a TDRA value or a subset of allowed TDRA values. In an aspect, DMRS generating component 352, e.g., in conjunction with processor(s) 312, memory 316, transceiver 302, scheduling component 342, etc., can determine the DMRS sequence that maps to the TDRA value or the subset of allowed TDRA values, which can correspond to a subset of possible TDRA values that the base station 102 may use in subsequent DCI (e.g., and the receiving device may assume the base station 102 does not use TDRA values outside of the subset). For example, DMRS generating component 352 can select a DMRS sequence that can be used to indicate the TDRA value (e.g., where the base station 102 and receiving device can know, store, or otherwise be configured with the mapping of DMRS sequence to TDRA value). In another example, DMRS generating component 352 can generate the DMRS sequence using the TDRA value as a parameter, as described.

In an example, where DMRS generating component 352 selects a TDRA value to indicate one of a subset of allowed TDRA values, optionally at Block 410, the base station can transmit a configuration indicating the allowed TDRA values. In an aspect, scheduling component 342, e.g., in conjunction with processor(s) 312, memory 316, transceiver 302, etc., can transmit the configuration indicating the allowed TDRA values. For example, the configuration may indicate an enumeration of TDRA values, and the DMRS can indicate an index into the enumeration. For example, the allowed TDRA values may include a set of values, as described. In this example, the TDRA value indicated by the DMRS may include an index of a TDRA value in the set. Moreover, in an example, where the actual TDRA value is not included in the set, DMRS generating component 352 can select one of the TDRA values in the set that is near the actual TDRA value (e.g., the smallest value greater than the actual TDRA value, the largest value less than the actual TDRA value, etc.).

In method 400, at Block 412, the base station can transmit the downlink control channel and the DMRS. In an aspect, channel transmitting component 354, e.g., in conjunction with processor(s) 312, memory 316, transceiver 302, scheduling component 342, etc., can transmit the downlink control channel and the DMRS. For example, channel transmitting component 354 can transmit the downlink control channel (e.g., PDCCH), which can include DCI for a downlink data channel, and can transmit the DMRS, which can be transmitted in the same symbol or at least the same slot as the PDCCH. For example, a receiving device can use the DMRS for performing channel estimation for decoding the PDCCH.

In method 400, at Block 414, the base station can transmit, based on the time offset, the downlink data channel after the downlink control channel. In an aspect, channel transmitting component 354, e.g., in conjunction with processor(s) 312, memory 316, transceiver 302, scheduling component 342, etc., can transmit, based on the time offset, the downlink data channel after the downlink control channel. For example, channel transmitting component 354 can transmit the downlink data channel (e.g., PDSCH) in resources occurring at a time period that is the time offset after the downlink control channel (e.g., a number of slots after the downlink control channel). In addition, for example, channel transmitting component 354 can transmit the downlink data channel as a number of symbols (e.g., L) within the slot that corresponds to a starting symbol (e.g., S), which may be indicated by a TDRA value by the DMRS and/or in the DCI.

In method 500, at Block 502, the UE can receive a DMRS corresponding to a downlink control channel. In an aspect, communicating component 242, e.g., in conjunction with processor(s) 212, memory 216, transceiver 202, etc., can receive the DMRS corresponding to the downlink control channel. For example, communicating component 242 can receive the DMRS in a same symbol or at least a same slot as the downlink control channel (e.g., PDCCH), and can use the DMRS for performing channel estimation of, or to otherwise determine one or more parameters for demodulating or decoding, the downlink control channel. Moreover, as described, the DMRS can have a sequence that indicates the time offset from the downlink control channel to a downlink data channel, such that the UE 104 can determine the time offset without having to decode DCI in the downlink control channel.

In method 500, optionally at Block 504, the UE can determine, based at least in part on a sequence of the DMRS, a time offset from the downlink control channel to a downlink data channel. In an aspect, time offset determining component 252, e.g., in conjunction with processor(s) 212, memory 216, transceiver 202, communicating component 242, etc., can determine, based at least in part on the sequence of the DMRS, the time offset from the downlink control channel to the downlink data channel. As described above, DMRS sequence detection can be faster than DCI decoding, and thus the UE can determine the time offset from the DMRS to determine whether or when or how long to buffer samples of the downlink data channel. In an example, the UE can determine to otherwise decrease a buffering time and/or buffer size used to buffer samples of the downlink data channel. For example, time offset determining component 252 can use multiple hypotheses to detect the timing offset value from the DMRS sequence. For example, time offset determining component 252 can determine the sequence as received, where the sequence can correspond to a sequence of subcarriers or other units of frequency used to transmit the DMRS in a symbol or other time division. Given multiple hypotheses for the time offset, and known values of OFDM symbol number within a slot, or slot number within a frame, $N_{ID}$ (or $N_{ID}^{cell}$), as described above, time offset determining component 252 can attempt to determine the time offset based on the hypotheses by determining a sequence for at least one or more of the hypotheses, and comparing the determined sequence(s) to the sequence of the received DMRS.

In an example, in determining the time offset at Block 504, optionally at Block 506, the UE can determine a mapping between the sequence of the DMRS and the time offset or a subset of allowed time offsets. In an aspect, time offset determining component 252, e.g., in conjunction with processor(s) 212, memory 216, transceiver 202, communicating component 242, etc., can determine the mapping between the sequence of the DMRS and the time offset or the subset of allowed time offsets. For example, time offset determining component 252 can determine the time offset that is indicated by or maps to the DMRS sequence (e.g., where the base station 102 and receiving device can know the mapping of DMRS sequence to time offset value). In one example, base station 102 can configure the UE 104 with the mapping (e.g., radio resource control (RRC) signaling, remaining minimum system information (RMSI), or other configuration signaling). In another example, time offset determining component 252 can determine the time offset value by testing different hypotheses for the time offset value and corresponding generated DMRS sequences, as described. At least where the time offset value is determined, time offset determining component 252 can still determine the TDRA value based on decoding the DCI (or otherwise determine the starting symbol offset, S, and/or length, L) so it can determine where within the slot the downlink data channel begins and/or a length (in symbols) of the downlink data channel.

In an example, where time offset determining component 252 determines a time offset value as one of a subset of allowed time offsets, optionally at Block 508, the UE can receive a configuration indicating the allowed time offsets. In an aspect, communicating component 242, e.g., in conjunction with processor(s) 212, memory 216, transceiver 202, etc., can receive (e.g., from the base station 102 in RRC signaling, RMSI, or other configuration signaling), the configuration indicating the allowed time offsets. For example, the configuration may indicate an enumeration of time offset values, and the DMRS can indicate an index into the enumeration. For example, the allowed time offsets may include the set of {0,5,10,15} slots. In this example, the time offset value indicated by the DMRS may include {0,1,2,3}, which can respectively refer to a time offset in the set. Moreover, in an example, where the actual time offset is not included in the set, time offset determining component 252 can determine one of the values in the set that is near the actual time offset (e.g., the smallest value greater than the actual time offset, the largest value less than the actual time offset, etc.). Moreover, in an example, the time offset or subset of allowed time offsets can correspond to a slot offset value (e.g., k0) and/or a corresponding symbol offset value within the slot.

In one example, in determine the time offset at Block 504, optionally at Block 510, the UE can determine a mapping between the sequence of the DMRS and a TDRA value or a subset of allowed TDRA values In an aspect, time offset determining component 252, e.g., in conjunction with processor(s) 212, memory 216, transceiver 202, communicating component 242, etc., can determine the mapping between the sequence of the DMRS and the TDRA value or the subset of allowed TDRA values, which can correspond to a subset of possible TDRA values that the base station 102 may use in subsequent DCI (e.g., and the UE 104 may assume the base station 102 does not use TDRA values outside of the subset). For example, time offset determining component 252 can determine the TDRA value that is indicated by or maps to the DMRS sequence (e.g., where the base station 102 and receiving device can know, store, or otherwise be configured with the mapping of DMRS sequence to TDRA value). In another example, time offset determining component 252 can determine the TDRA value by testing different hypotheses for the TDRA value and corresponding generated DMRS sequences, as described.

In an example, where time offset determining component 252 determines a TDRA value as one of a subset of allowed TDRA values, optionally at Block 512, the UE can receive a configuration indicating the allowed TDRA values. In an aspect, communicating component 242, e.g., in conjunction with processor(s) 212, memory 216, transceiver 202, etc., can receive the configuration indicating the allowed TDRA values. For example, communicating component 242 can receive the configuration from the base station 102 or other node in RRC signaling, RMSI, or other configuration signaling. For example, the configuration may indicate an enumeration of TDRA values, and the DMRS can indicate an index into the enumeration. For example, the allowed TDRA values may include a set of values, as described. In this example, the TDRA value indicated by the DMRS may include an index of a TDRA value in the set. Moreover, in an example, where the actual TDRA value is not included in the set, time offset determining component 252 can determine one of the TDRA values in the set that is near the actual TDRA value (e.g., the smallest value greater than the actual TDRA value, the largest value less than the actual TDRA value, etc.).

In method 500, optionally at Block 514, the UE can buffer, based on receiving the DMRS, samples of a downlink data channel associated with the downlink control channel. In an aspect, sample buffering component 254, e.g., in conjunction with processor(s) 212, memory 216, transceiver 202, communicating component 242, etc., can buffer, based on receiving the DMRS, samples of the downlink data channel associated with the downlink control channel. For example, sample buffering component 254 can buffer the samples by storing the received samples, and/or representative data or information, in a memory 216 or other storage for possible subsequent processing. In an example, sample buffering component 254 can store time information for the samples for subsequent determination of which samples to process, as described further herein. Moreover, in an example, sample buffering component 254 can begin buffering samples of the downlink data channel once the downlink control channel is detected and/or received, etc. In addition, as described above and further herein, sample buffering component 254 can determine how to buffer samples based on the DMRS, such as starting buffering based on receiving the DMRS or the downlink control channel, pausing buffering and/or flushing the buffer where the DMRS indicates a slot offset subsequent in time to a current slot, begin or continue buffering at the slot offset until DCI can be decoded, etc.

In method 500, optionally at Block 516, the UE can determine, based at least in part on the time offset, a time period based on which to start processing samples of the downlink data channel. In an aspect, communicating component 242, e.g., in conjunction with processor(s) 212, memory 216, transceiver 202, etc., can determine, based at least in part on the time offset, the time period based on which to start processing samples of the downlink data channel (e.g., from the buffer or otherwise). For example, where the time offset indicates a slot offset, communicating component 242 can determine that the downlink data channel (e.g., PDSCH) corresponding to the uplink control channel (e.g., PDCCH) starts in a slot that is a number of slots, indicated by the slot offset, from the uplink control channel. In this example, communicating component 242 may determine a starting symbol within the slot and/or a length of the downlink data channel (e.g., in symbols) based on other parameters, based on the TDRA value decoded from DCI, etc. In another example, where the time offset indicates a TDRA value, communicating component 242 can determine that the downlink data channel (e.g., PDSCH) corresponding to the uplink control channel (e.g., PDCCH) starts in a slot that is a number of slots, indicated by the slot offset k0, from the uplink control channel. In this example, communicating component 242 can determine the slot offset k0 specified for the TDRA value in a lookup table, and/or can determine the starting symbol, S, the length, L, etc.

In method 500, optionally at Block 518, the UE can process samples of the downlink data channel corresponding to the time period. In an aspect, communicating component 242, e.g., in conjunction with processor(s) 212, memory 216, transceiver 202, etc., can process samples of the downlink data channel (e.g., PDSCH) corresponding to the time period. For example, communicating component 242 can process samples received in the slot indicated by the slot offset, at the indicated starting symbol within the slot, for an indicated length, etc., as described. In an example, sample buffering component 254 can buffer samples of the downlink data channel that are received following the downlink control channel and at least until the DMRS is processed and/or based on determining a starting slot or symbol from the DMRS, as described. Where the time offset is less than the time it takes to process the DMRS, for example, at least some of the buffered samples may be processed.

As described above, the early indication of the time offset can be used to allow the UE 104 to determine when and/or whether to buffer samples, which can improve UE performance. Thus, sample buffering component 254 can begin buffering samples of the downlink data channel after receiving the downlink control channel and at least until the DMRS is received or the time offset is accordingly determined from the DMRS.

In method 500, optionally at Block 520, the UE can determine, based at least in part on the time offset, at least one of whether to continue buffering samples of the downlink data channel or whether to flush the buffered samples of the downlink data channel. In an aspect, sample buffering component 254, e.g., in conjunction with processor(s) 212, memory 216, transceiver 202, communicating component 242, etc., can determine, based at least in part on the time offset, at least one of whether to continue buffering samples of the downlink data channel or whether to flush the buffered samples of the downlink data channel.

For example, where the time offset determined from the DMRS is less than a current time offset from the downlink control channel, sample buffering component 254 can determine to continue buffering samples at least for a period of time corresponding to the determined time offset from the downlink control channel and possibly for the length of the downlink data channel (if known, e.g., where the DMRS indicates the TDRA value). In another example, sample buffering component 254 can continue buffering the samples until DCI is decoded and other parameters related to the downlink data channel can be accordingly determined.

In another example, where the time offset determined from the DMRS is greater than a current time offset from the downlink control channel, sample buffering component 254 can determine to flush the buffered samples at least for a time period from the beginning of the downlink control channel until the determined time offset (or until DCI is decoded), and/or can determine to stop buffering samples until the time corresponding to the time offset from the downlink control channel. In addition, for example, where the determined time offset is greater than a current time offset from the downlink control channel, sample buffering component 254 can also determine to start buffering samples of the downlink data channel from the time corresponding to the time offset from the downlink control channel and for the length of the downlink data channel (if known, e.g., where the DMRS indicates the TDRA value, or until DCI is decoded and other parameters related to the downlink data channel can be accordingly determined. Where sample buffering component 254 determines to flush buffered samples, optionally at Block 522, the UE can flush the buffered samples. In an aspect, sample buffering component 254, e.g., in conjunction with processor(s) 212, memory 216, transceiver 202, communicating component 242, etc., can flush the buffered samples, which can include removing at least a portion of buffered samples from a memory (e.g., memory 216). An example is shown in FIG. 6.

Figure 6:
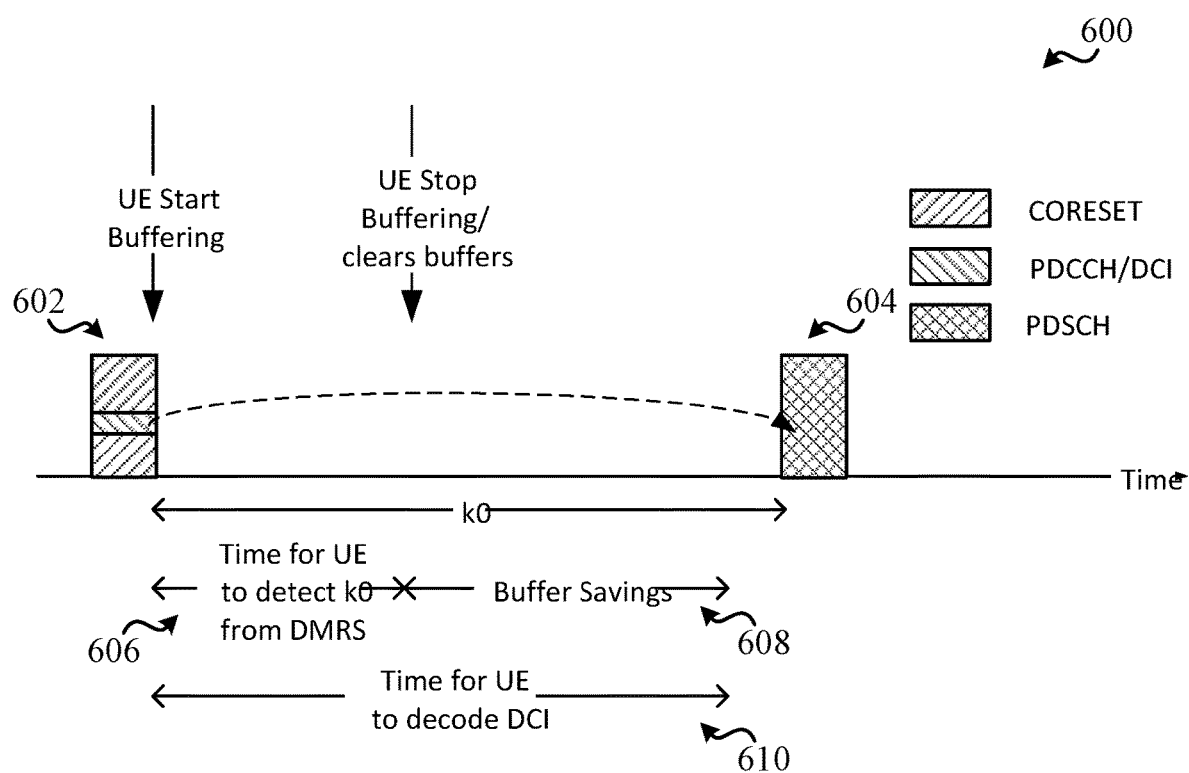
FIG. 6 illustrates an example of a resource allocation for determining a time offset based on a DMRS.

FIG. 6 illustrates an example of a resource allocation 600 including a CORESET and PDCCH/DCI 602 that is initially received and indicates control information for PDSCH 604, which is k0 slot offset from CORESET and PDCCH/DCI 602. A DMRS can also be transmitted with CORESET and PDCCH/DCI 602 and can indicate the time offset (e.g., k0, or a value from which k0 can be determined). The UE can accordingly process the DMRS and determine the time offset in time period 606 to achieve a buffer savings 608 over the time it takes for the UE to decode DCI 610.

For example, it may still take time for the UE to detect the k0/TDRA value from the PDCCH DMRS, so the UE can still buffer samples until k0 is detected from the DMRS, as described above. In one example, to reduce the buffering even further, the UE can send capability information related to whether the UE can support the early detecting of the time offset (e.g., based on DMRS). In method 500, optionally at Block 524, the UE can transmit a capability indicating a supported time for determining time offsets based on DMRS sequences. In an aspect, communicating component 242, e.g., in conjunction with processor(s) 212, memory 216, transceiver 202, etc., can transmit the capability indicating the supported time for determining time offsets based on DMRS sequences. For example, the capability can indicate the ability of the UE 104 to determine time offset based on DMRS or parameters related to how long it takes the UE to determine time offset from DMRS. In an example, the capability can be based on (and/or specified for each of) a number of PDCCH candidates, a number of time offset hypotheses supported by the UE in processing the DMRS to determine the time offset, a corresponding SCS, etc., which can allow the base station 102 to determine a time for the UE 104 to ascertain the time offset from the DMRS. The base station 102 can, in one example, set the time offset to be at least the supported time indicated in the capability. In an example, communicating component 242 can transmit the capability based on a request from the base station 102, along with other capability information for the UE 104, etc., which may be via RRC or other higher layer signaling.

In method 400, optionally at Block 416, the base station can receive a capability indicating a supported time for determining time offsets based on DMRS sequences. In an aspect, scheduling component 342, e.g., in conjunction with processor(s) 312, memory 316, transceiver 302, etc., can receive (e.g., from the UE 104) the capability indicating the supported time for determining time offsets based on DMRS sequences. As described, the capability may be specified for a number of PDCCH candidates, a number of time offset hypotheses, a corresponding SCS, etc., and scheduling component 342 can determine the supported time based on the number of PDCCH candidates, the number of time offset hypotheses configured, the SCS, etc. In this example, scheduling component 342 can determine a time offset between the downlink control channel and the downlink data channel that is at least the supported time (e.g., and in generating the DMRS to indicate the time offset at Block 402, DMRS generating component 352 can specify the time offset that is at least the supported time). Thus, for example, the network can ensure it does not schedule TDRA that is smaller than the UE capability.

In addition, for example, in method 400, optionally at Block 418, the base station can transmit an indication that the time offset is not less than the supported time. In an aspect, scheduling component 342, e.g., in conjunction with processor(s) 312, memory 316, transceiver 302, etc., can transmit the indication that the time offset is not less than the supported time. In an example, scheduling component 342 can transmit the indication for all time offsets for the UE 104 (e.g., in RRC or other higher layer signaling), or for each time offset (e.g., in control signaling), so the UE 104 can determine whether the base station 102 sets the time offsets in consideration of the supported time for the UE 104.

In method 500, optionally at Block 526, the UE can receive an indication that the time offset is not less than the supported time. In an aspect, communicating component 242, e.g., in conjunction with processor(s) 212, memory 216, transceiver 202, etc., can receive the indication (e.g., from the base station 102) that the time offset is not less than the supported time indicated by the UE 104. Based on this indication, for example, time offset determining component 252 can decide to determine the time offset from the DMRS, and sample buffering component 254 may not need to buffer samples, or may only buffer samples from the time of receiving the DMRS until decoding DCI to determine other parameters for receiving the downlink data channel. If the indication is not received (and/or the capability is not indicated), however, sample buffering component 254 can start PDSCH sample buffering from the PDCCH DCI reception. An example is shown in FIG. 7.

Figure 7:
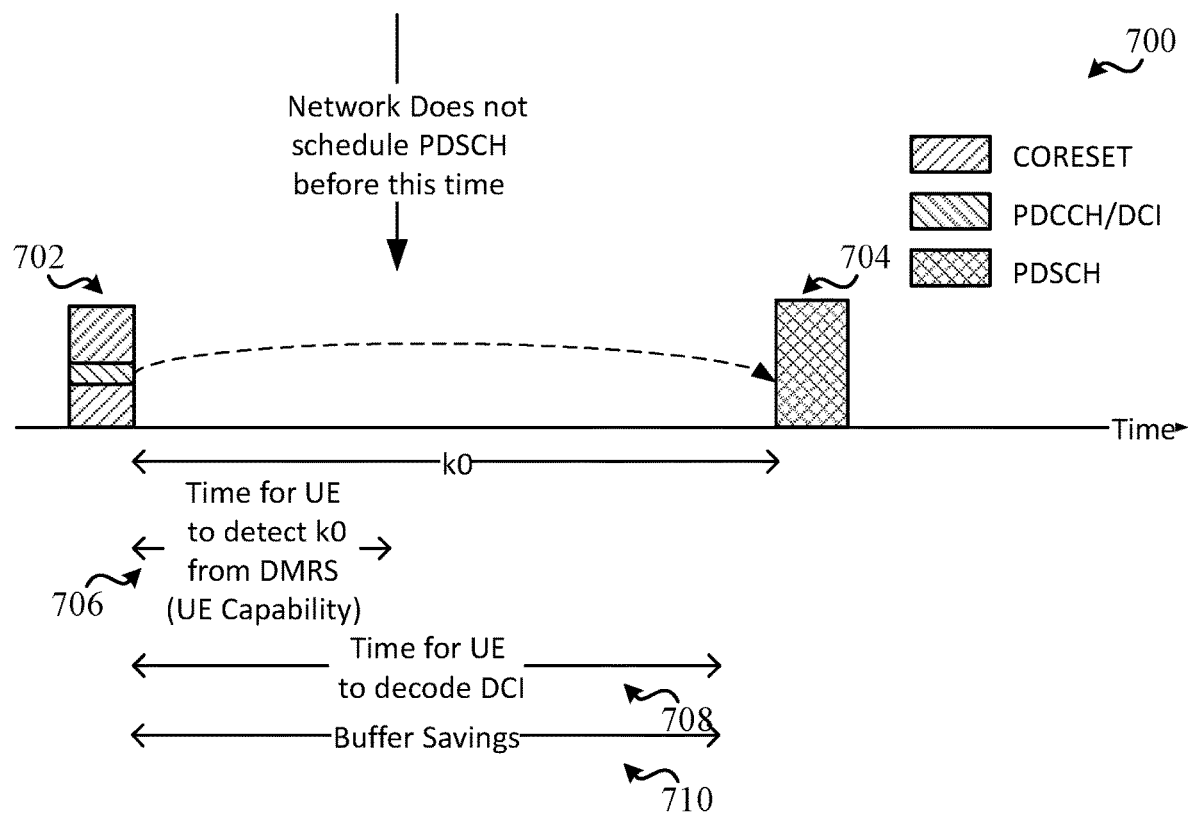
FIG. 7 illustrates an example of a resource allocation for indicating a capability for determining a time offset based on a DMRS.

FIG. 7 illustrates an example of a resource allocation 700 including a CORESET and PDCCH/DCI 702 that is initially received and indicates control information for PDSCH 704, which is k0 slot offset from CORESET and PDCCH/DCI 702. A DMRS can also be transmitted with CORESET and PDCCH/DCI 702 and can indicate the time offset (e.g., k0, or a value from which k0 can be determined). Based on an indicated capability of the UE to detect time offset from DMRS within a time period 706, the network can refrain from scheduling the PDSCH before the end of time period 706 (and may indicate this to the UE). The UE can accordingly refrain from buffering until this point as well, and can process the DMRS and determine the time offset after time period 706. Thus, the UE can achieve a buffer savings 708 over the time it takes for the UE to decode DCI 710.

Figure 8:
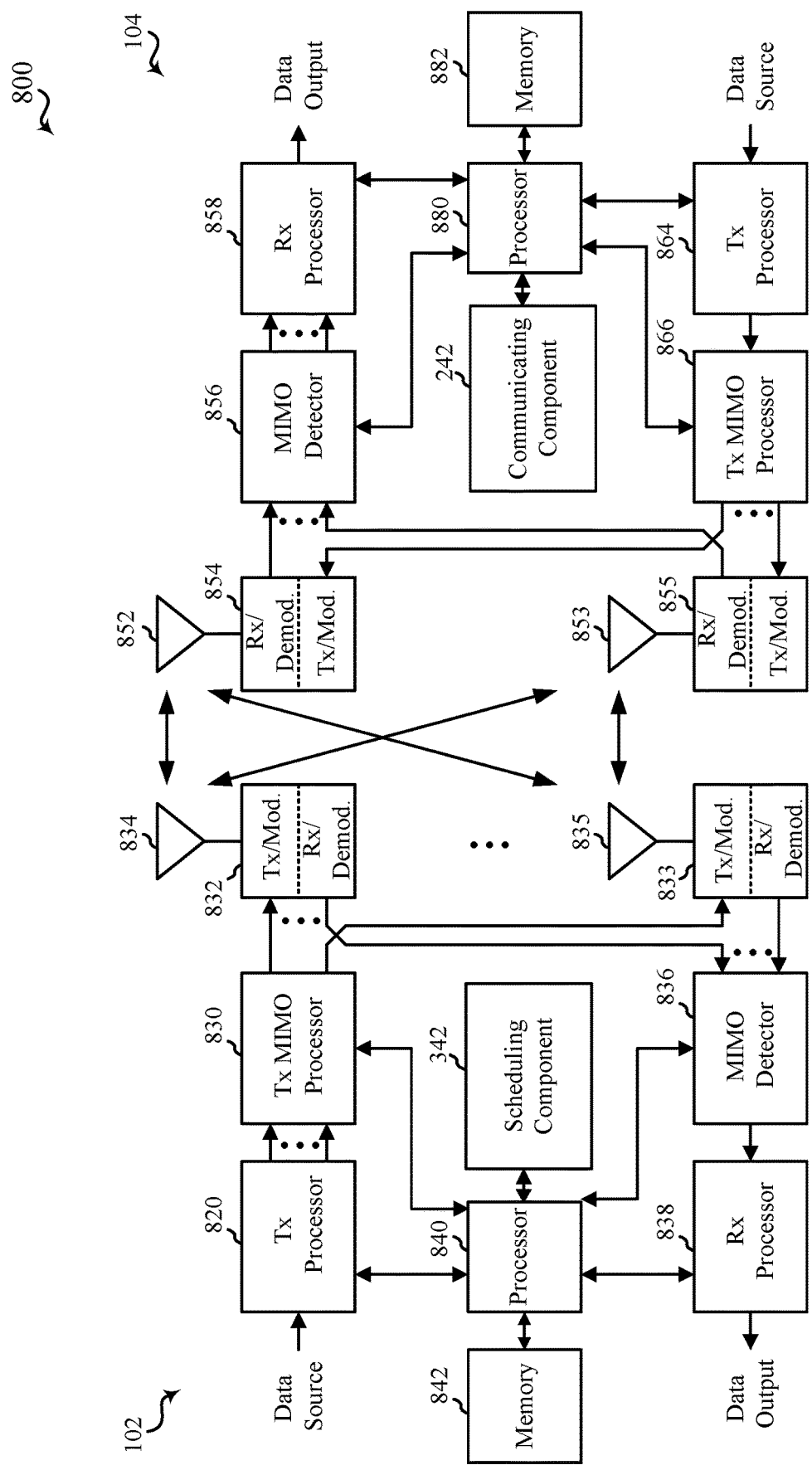
FIG. 8 is a block diagram illustrating an example of a MIMO communication system including a base station and a UE, in accordance with various aspects of the present disclosure.

FIG. 8 is a block diagram of a MIMO communication system 800 including a base station 102 and a UE 104. The MIMO communication system 800 may illustrate aspects of the wireless communication access network 100 described with reference to FIG. 1. The base station 102 may be an example of aspects of the base station 102 described with reference to FIG. 1. The base station 102 may be equipped with antennas 834 and 835, and the UE 104 may be equipped with antennas 852 and 853. In the MIMO communication system 800, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 820 may receive data from a data source. The transmit processor 820 may process the data. The transmit processor 820 may also generate control symbols or reference symbols. A transmit MIMO processor 830 may perform spatial processing (e.g., precoding) on data symbols, control symbols, or reference symbols, if applicable, and may provide output symbol streams to the transmit modulator/demodulators 832 and 833. Each modulator/demodulator 832 through 833 may process a respective output symbol stream (e.g., for OFDM, etc.) to obtain an output sample stream. Each modulator/demodulator 832 through 833 may further process (e.g., convert to analog, amplify, filter, and upconvert) the output sample stream to obtain a DL signal. In one example, DL signals from modulator/demodulators 832 and 833 may be transmitted via the antennas 834 and 835, respectively.

The UE 104 may be an example of aspects of the UEs 104 described with reference to FIGS. 1-2. At the UE 104, the UE antennas 852 and 853 may receive the DL signals from the base station 102 and may provide the received signals to the modulator/demodulators 854 and 855, respectively. Each modulator/demodulator 854 through 855 may condition (e.g., filter, amplify, downconvert, and digitize) a respective received signal to obtain input samples. Each modulator/demodulator 854 through 855 may further process the input samples (e.g., for OFDM, etc.) to obtain received symbols. A MIMO detector 856 may obtain received symbols from the modulator/demodulators 854 and 855, perform MIMO detection on the received symbols, if applicable, and provide detected symbols. A receive (Rx) processor 858 may process (e.g., demodulate, deinterleave, and decode) the detected symbols, providing decoded data for the UE 104 to a data output, and provide decoded control information to a processor 880, or memory 882.

The processor 880 may in some cases execute stored instructions to instantiate a communicating component 242 (see e.g., FIGS. 1 and 2).

On the uplink (UL), at the UE 104, a transmit processor 864 may receive and process data from a data source. The transmit processor 864 may also generate reference symbols for a reference signal. The symbols from the transmit processor 864 may be precoded by a transmit MIMO processor 866 if applicable, further processed by the modulator/demodulators 854 and 855 (e.g., for SC-FDMA, etc.), and be transmitted to the base station 102 in accordance with the communication parameters received from the base station 102. At the base station 102, the UL signals from the UE 104 may be received by the antennas 834 and 835, processed by the modulator/demodulators 832 and 833, detected by a MIMO detector 836 if applicable, and further processed by a receive processor 838. The receive processor 838 may provide decoded data to a data output and to the processor 840 or memory 842.

The processor 840 may in some cases execute stored instructions to instantiate a scheduling component 342 (see e.g., FIGS. 1 and 3).

The components of the UE 104 may, individually or collectively, be implemented with one or more ASICs adapted to perform some or all of the applicable functions in hardware. Each of the noted modules may be a means for performing one or more functions related to operation of the MIMO communication system 800. Similarly, the components of the base station 102 may, individually or collectively, be implemented with one or more application specific integrated circuits (ASICs) adapted to perform some or all of the applicable functions in hardware. Each of the noted components may be a means for performing one or more functions related to operation of the MIMO communication system 800.

The following aspects are illustrative only and aspects thereof may be combined with aspects of other embodiments or teaching described herein, without limitation.

Aspect 1 is a method for wireless communication including receiving a DMRS corresponding to a downlink control channel, determining, based at least in part on a sequence of the DMRS, a time offset from the downlink control channel to a downlink data channel, and determining, based at least in part on the time offset, a time period based on which to start processing samples of the downlink data channel.

In Aspect 2, the method of Aspect 1 includes buffering samples of the downlink data channel based on receiving the downlink control channel corresponding to the downlink data channel, and determining, based at least in part on the time offset, at least one of whether to continue the buffering samples of the downlink data channel or whether to flush buffered samples of the downlink data channel.

In Aspect 3, the method of Aspect 2 includes where determining the time period includes determining to process at least a portion of the buffered samples of the downlink data channel.

In Aspect 4, the method of any of Aspects 1 to 3 includes where determining the time offset includes determining a mapping between the sequence of the DMRS and the time offset.

In Aspect 5, the method of any of Aspects 1 to 4 includes where determining the time offset includes determining a mapping between the sequence of the DMRS and a subset of allowed time offsets.

In Aspect 6, the method of Aspect 5 includes receiving a configuration indicating the allowed time offsets.

In Aspect 7, the method of any of Aspects 1 to 6 includes where determining the time offset includes determining a mapping between the sequence of the DMRS and a TDRA value, and further comprising determining, from a lookup table, the time offset based at least in part on a TDRA time offset value indicated for the TDRA value.

In Aspect 8, the method of any of Aspects 1 to 7 includes where determining the time offset includes determining a mapping between the sequence of the DMRS and a subset of allowed TDRA values.

In Aspect 9, the method of Aspect 8 includes receiving a configuration indicating the allowed TDRA values.

In Aspect 10, the method of any of Aspects 1 to 9 includes transmitting a capability indicating a supported time for determining time offsets based on DMRS sequences.

In Aspect 11, the method of Aspect 10 includes where the capability is indicated for at least one of a number of control channel candidates, a number of time offset or TDRA value hypotheses, or a subcarrier spacing.

In Aspect 12, the method of any of Aspects 10 or 11 includes receiving an indication that the time offset is not less than the supported time, where determining, based at least in part on the sequence of the DMRS, the time offset is based at least in part on receiving the indication.

Aspect 13 is a method for wireless communication including generating a DMRS corresponding to a downlink control channel to have a DMRS sequence indicating a time offset from the downlink control channel to a downlink data channel, transmitting the downlink control channel and the DMRS, and transmitting, based on the time offset, the downlink data channel after the downlink control channel.

In Aspect 14, the method of Aspect 13 includes where generating the DMRS includes determining the DMRS sequence that maps to the time offset.

In Aspect 15, the method of any of Aspects 13 or 14 includes where generating the DMRS includes determining the DMRS sequence that maps to a subset of allowed time offsets that includes the time offset.

In Aspect 16, the method of Aspect 15 includes transmitting a configuration indicating the allowed time offsets.

In Aspect 17, the method of any of Aspects 13 to 16 includes where generating the DMRS includes determining the DMRS sequence that maps to a TDRA value related to the time offset.

In Aspect 18, the method of any of Aspects 13 to 17 includes where generating the DMRS includes determining the DMRS sequence that maps to a subset of allowed TDRA values that includes a TDRA value related to the time offset.

In Aspect 19, the method of Aspect 18 includes transmitting a configuration indicating the allowed TDRA values.

In Aspect 20, the method of any of Aspects 13 to 19 includes receiving a capability indicating a supported time for determining time offsets based on DMRS sequences, where generating the DMRS includes selecting a DMRS sequence based on determining that the time offset is within the supported time.

In Aspect 21, the method of Aspect 20 includes where the capability is indicated for at least one of a number of control channel candidates, a number of time offset or TDRA value hypotheses, or a subcarrier spacing.

In Aspect 22, the method of any of Aspects 20 or 21 includes transmitting an indication that the time offset is not less than the supported time.

Aspect 23 is a method for wireless communication including receiving a DMRS corresponding to a downlink control channel, buffering, based on receiving the DMRS, samples of a downlink data channel associated with the downlink control channel, and processing, during on a time period indicated based at least in part on a sequence of the DMRS, at least a portion of the samples of the downlink data channel.

In Aspect 24, the method of Aspect 23 includes where the sequence of the DMRS indicates a time offset from the downlink control channel to the downlink data channel, and wherein processing at least the portion of the samples during on the time period is based on the time offset.

In Aspect 25, the method of any of Aspects 23 or 24, includes, based at least in part on the time offset, one of continuing the buffering samples of the downlink data channel or flushing buffered samples of the downlink data channel.

In Aspect 26, the method of any of Aspects 23 to 25 includes determining the time offset based on a mapping between the sequence of the DMRS and the time offset.

In Aspect 27, the method of any of Aspects 23 to 26 includes determining the time offset based on a mapping between the sequence of the DMRS and a subset of allowed time offsets.

In Aspect 28, the method of Aspect 27 includes receiving a configuration indicating the allowed time offsets.

In Aspect 29, the method of any of Aspects 23 to 28 includes determining the time offset based on a mapping between the sequence of the DMRS and a TDRA value, and further comprising determining, from a lookup table, the time offset based at least in part on a TDRA time offset value indicated for the TDRA value.

In Aspect 30, the method of any of Aspects 23 to 29 includes determining the time offset based on a mapping between the sequence of the DMRS and a subset of allowed TDRA values.

In Aspect 31, the method of Aspect 30 includes receiving a configuration indicating the allowed TDRA values.

In Aspect 32, the method of any of Aspects 23 to 31 includes transmitting a capability indicating a supported time for determining time offsets based on DMRS sequences.

In Aspect 33, the method of Aspect 32 includes where the capability is indicated for at least one of a number of control channel candidates, a number of time offset or TDRA value hypotheses, or a subcarrier spacing.

In Aspect 34, the method of Aspect 32 includes receiving an indication that the time offset is not less than the supported time, and determining, based at least in part on the sequence of the DMRS, the time offset based at least in part on receiving the indication.

Aspect 35 is an apparatus for wireless communication including a transceiver, a memory configured to store instructions, and one or more processors communicatively coupled with the memory and the transceiver, where the one or more processors are configured to perform one or more of the methods of any of Aspects 1 to 34.

Aspect 36 is an apparatus for wireless communication including means for performing one or more of the methods of any of Aspects 1 to 34.

Aspect 37 is a computer-readable medium including code executable by one or more processors for wireless communications, the code including code for performing one or more of the methods of any of Aspects 1 to 34.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration. The processors can be coupled (e.g., communicatively, operationally, electrically, electronically, or otherwise) to memory.

The functions described herein may be implemented in hardware, software (e.g., executed by a processor), or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented in software executed by a processor, the functions may be stored on or transmitted over as one or more instructions or code on a computer-readable medium. If implemented in software (e.g., executed by a processor), the functions may be stored on or transmitted over as one or more instructions or code on a non-transitory computer-readable medium. Other examples and implementations are within the scope and spirit of the disclosure and appended claims. For example, due to the nature of software, functions described above can be implemented using software (e.g., executed by a specially programmed processor), hardware, hardwiring, or combinations of any of these. Features implementing functions may also be physically located at various positions, including being distributed such that portions of functions are implemented at different physical locations. Also, as used herein, including in the claims, "or" (e.g., as used in a list of items prefaced by "at least one of") indicates a disjunctive list such that, for example, a list of "at least one of A, B, or C" means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or,"

when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:
   a transceiver;
   a memory configured to store instructions; and
   one or more processors coupled with the memory and the transceiver, wherein the one or more processors are configured to:
   receive a demodulation reference signal (DMRS) that can be used to perform channel estimation for a downlink control channel, wherein a sequence of the DMRS indicates a time offset from the downlink control channel to a downlink data channel;
   buffer, based on receiving the DMRS and until a time at which the time offset is determined from the sequence of the DMRS, samples of the downlink data channel associated with the downlink control channel;
   flush buffered samples of the downlink data channel where the time offset from the downlink control channel is after the time at which the time offset is determined from the sequence of the DMRS; and
   process at least a portion of the buffered samples of the downlink data channel where the time offset from the downlink control channel is before the time at which the time offset is determined from the sequence of the DMRS.

2. The apparatus of claim 1, wherein the one or more processors are further configured to determine the time offset based on a mapping between the sequence of the DMRS and the time offset.

3. The apparatus of claim 1, wherein the one or more processors are further configured to determine the time offset based on a mapping between the sequence of the DMRS and a subset of allowed time offsets.

4. The apparatus of claim 3, wherein the one or more processors are further configured to receive a configuration indicating the allowed time offsets.

5. The apparatus of claim 1, wherein the one or more processors are further configured to determine the time offset based on a mapping between the sequence of the DMRS and a time domain resource assignment (TDRA) value, and determine, from a lookup table, the time offset based at least in part on a TDRA time offset value indicated for the TDRA value.

6. The apparatus of claim 1, wherein the one or more processors are further configured to determine the time offset based on a mapping between the sequence of the DMRS and a subset of allowed time domain resource assignment (TDRA) values.

7. The apparatus of claim 6, wherein the one or more processors are further configured to receive a configuration indicating the allowed TDRA values.

8. The apparatus of claim 1, wherein the one or more processors are further configured to transmit a capability indicating a supported time for determining time offsets based on DMRS sequences.

9. The apparatus of claim 8, wherein the capability is indicated for at least one of a number of control channel candidates, a number of time offset or time domain resource assignment (TDRA) value hypotheses, or a subcarrier spacing.

10. The apparatus of claim 8, wherein the one or more processors are further configured to:
    receive an indication that the time offset is not less than the supported time; and
    determine, based at least in part on the sequence of the DMRS, the time offset based at least in part on receiving the indication.

11. An apparatus for wireless communication, comprising:
    a transceiver;
    a memory configured to store instructions; and
    one or more processors coupled with the memory and the transceiver, wherein the one or more processors are configured to:
    generate a demodulation reference signal (DMRS) that can be used to perform channel estimation for a downlink control channel to have a DMRS sequence indicating a time offset from the downlink control channel to a downlink data channel, wherein the one or more processors are configured to generate the DMRS at least in part by determining the DMRS sequence that maps to the time offset;

transmit the downlink control channel and the DMRS; and transmit, based on the time offset, the downlink data channel after the downlink control channel.

12. The apparatus of claim 11, wherein the one or more processors are configured to generate the DMRS at least in part by determining the DMRS sequence that maps to a subset of allowed time offsets that includes the time offset.

13. The apparatus of claim 12, wherein the one or more processors are further configured to transmit a configuration indicating the allowed time offsets.

14. The apparatus of claim 11, wherein the one or more processors are configured to generate the DMRS at least in part by determining the DMRS sequence that maps to a time domain resource assignment (TDRA) value related to the time offset.

15. The apparatus of claim 11, wherein the one or more processors are configured to generate the DMRS at least in part by determining the DMRS sequence that maps to a subset of allowed time domain resource assignment (TDRA) values that includes a TDRA value related to the time offset.

16. The apparatus of claim 15, wherein the one or more processors are further configured to transmit a configuration indicating the allowed TDRA values.

17. The apparatus of claim 11, wherein the one or more processors are further configured to receive a capability indicating a supported time for determining time offsets based on DMRS sequences, wherein the one or more processors are configured to generate the DMRS at least in part by selecting a DMRS sequence based on determining that the time offset is within the supported time.

18. The apparatus of claim 17, wherein the capability is indicated for at least one of a number of control channel candidates, a number of time offset or time domain resource assignment (TDRA) value hypotheses, or a subcarrier spacing.

19. The apparatus of claim 17, wherein the one or more processors are further configured to transmit an indication that the time offset is not less than the supported time.

20. A method for wireless communication, comprising:

receiving a demodulation reference signal (DMRS) that can be used to perform channel estimation for a downlink control channel, wherein a sequence of the DMRS indicates a time offset from the downlink control channel to a downlink data channel;

buffering, based on receiving the DMRS and until a time at which the time offset is determined from the sequence of the DMRS, samples of the downlink data channel associated with the downlink control channel;

flushing buffered samples of the downlink data channel where the time offset from the downlink control channel is after the time at which the time offset is determined from the sequence of the DMRS; and processing at least a portion of the buffered samples of the downlink data channel where the time offset from the downlink control channel is before the time at which the time offset is determined from the sequence of the DMRS.

21. The method of claim 20, further comprising determining the time offset based on a mapping between the sequence of the DMRS and the time offset.

22. The method of claim 20, further comprising determining the time offset based on a mapping between the sequence of the DMRS and a subset of allowed time offsets.

23. The method of claim 20, further comprising determining the time offset based on a mapping between the sequence of the DMRS and a time domain resource assignment (TDRA) value, and further comprising determining, from a lookup table, the time offset based at least in part on a TDRA time offset value indicated for the TDRA value.

24. The method of claim 20, further comprising:

receiving a configuration indicating allowed time domain resource assignment (TDRA) values; and determining the time offset based on a mapping between the sequence of the DMRS and a subset of the allowed TDRA values.

25. The method of claim 20, further comprising:

transmitting a capability indicating a supported time for determining time offsets based on DMRS sequences;

receiving an indication that the time offset is not less than the supported time; and determining, based at least in part on the sequence of the DMRS, the time offset based at least in part on receiving the indication.

26. A method for wireless communication, comprising:

generating a demodulation reference signal (DMRS) that can be used to perform channel estimation for a downlink control channel to have a DMRS sequence indicating a time offset from the downlink control channel to a downlink data channel, wherein generating the DMRS includes determining the DMRS sequence that maps to the time offset;

transmitting the downlink control channel and the DMRS; and transmitting, based on the time offset, the downlink data channel after the downlink control channel.

* * * * *